No. 686,136. Patented Nov. 5, 1901.
U. G. ROGERS.
ARMATURE ADJUSTING DEVICE FOR RELAYS OR OTHER INSTRUMENTS.
(Application filed Apr. 19, 1901.)
(No Model.)

WITNESSES:
Frank S. Ober
John C. Francis

INVENTOR
Ulysses G. Rogers,
BY
A. P. Thayer
ATTORNEY

THE NORRIS PETERS CO., PHOTO-LITHO., WASHINGTON, D. C.

UNITED STATES PATENT OFFICE.

ULYSSES G. ROGERS, OF NEW YORK, N. Y.

ARMATURE-ADJUSTING DEVICE FOR RELAYS OR OTHER INSTRUMENTS.

SPECIFICATION forming part of Letters Patent No. 686,136, dated November 5, 1901.

Application filed April 19, 1901. Serial No. 56,591. (No model.)

*To all whom it may concern:*

Be it known that I, ULYSSES G. ROGERS, a citizen of the United States of America, and a resident of New York city, county and State of New York, have invented certain new and useful Improvements in Armature-Adjusting Devices for Relays or other Instruments, of which the following is a specification.

My invention relates to the tension-adjusting device for the armature-retracting springs in relays and other electric instruments; and it consists of the pin whereon the adjusting-cord is wound, having a split and expanding end portion and a socket-post for the pin contrived in such relation that constriction of the expanding portions of the pin when inserted in the socket-post produces friction to hold the pin wherever it may be set in turning it for adjusting the tension of the spring, the friction being always the same. The socket is set upright on the base of the instrument, and thus the adjusting device comprises but two pieces only, as hereinafter described, reference being made to the accompanying drawings, in which—

Figure 1:
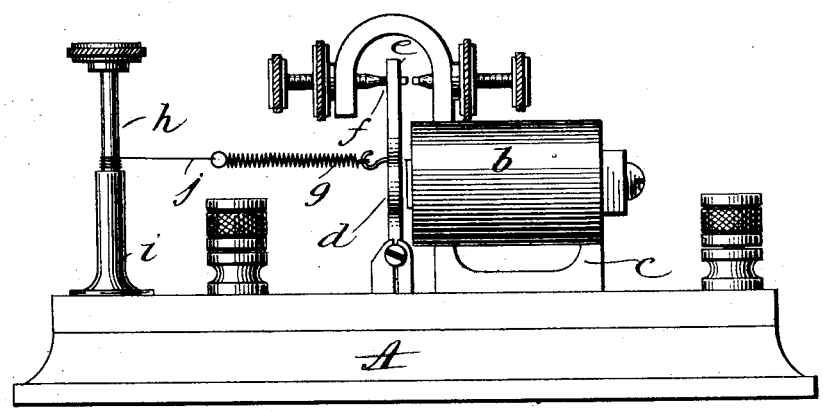
Figure 2:
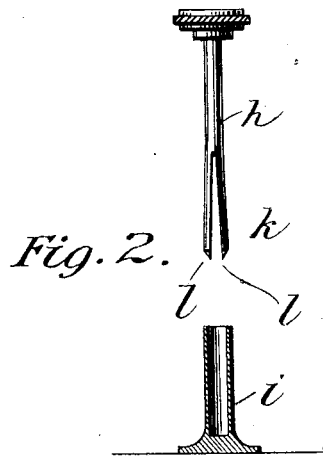

Figure 1 is a side elevation of the relay. Fig. 2 is a sectional elevation of the socket-post and a side elevation of the pin detached from the post.

A represents the base-plate of a relay instrument; $b$, one of the spools of the electromagnet; $c$, the supporting-frame; $d$, the armature; $e$ and $f$, contact-points; $g$, the tension-spring of the armature; $h$, the tension-adjusting pin; $i$, the socket-post for reception of the spring, and $j$ the cord connecting the tension-spring with the adjusting-pin for winding around the pin to vary the tension.

As commonly arranged the socket-post is constructed with a split taper and screw-threaded upper portion and provided with a taper tapped nut, which when screwed down contracts the jaws of the split part against the pin to hold it in its set position, and said nut being unscrewed releases the grip and allows the pin to be adjusted.

Now I purpose to economize in the cost of construction of the device and in the time and labor of manipulation by providing a simple plain unslitted and unthreaded cylindrically-bored socket-post and a slitted pin with jaws $k$, having expanding action of sufficient tension to produce by pressing against the inner surface of the socket of the post the necessary friction to hold the pin in its set position against the pull of the tension-spring. The jaws are pointed at the ends $l$ to facilitate inserting the pin in the socket. For the pin I will employ densely-drawn wire, which being split will naturally expand, owing to the greater tension of the outer portions of the metal. With such an adjusting device no time is lost in slacking the grip by unscrewing the nut preparatory to shifting the pin nor in tightening the grip again afterward, it being only necessary to turn the pin, and the pin will not work slack, as taper pins will, whether solid or split.

My cylindrically-bored socket-post has no function whatever in connection with taper split pins, which may have been used for some purposes in connection with taper sockets, and my solid cylindrical socket is a more reliable device than a split socket with contractile jaws, such as represented in the patent to Geary, No. 438,233, dated October 14, 1890, which to be practically effective must be bored tapering in order that the ends of the jaws may have grip on the pin, which is more expensive than the socket of my construction. Neither the socket nor the pin of my construction need to be tapered.

What I claim as my invention is—

In an armature-spring-tension-adjusting device, the combination of the cylindrically-bored socket-post set upright on the base of the instrument, rotatory split cylindrical pin having naturally-expanding jaws constricted in said socket, armature-spring, and the cord connecting said spring and pin.

Signed at New York city this 15th day of April, 1901.

ULYSSES G. ROGERS.

Witnesses:
A. P. THAYER,
C. SEDGWICK.